(12) United States Patent
Burugupalli et al.

(10) Patent No.: US 10,681,641 B2
(45) Date of Patent: Jun. 9, 2020

(54) POWER REDUCTION IN ACTIVITY MONITOR BASED ON AREA UPDATE

(71) Applicant: APPLE INC., Cupertino, CA (US)

(72) Inventors: Srinivas Burugupalli, Union City, CA (US); Muthukumaran Dhanapal, Sunnyvale, CA (US); Vijay Venkataraman, San Jose, CA (US); Srirang A. Lovlekar, Cupertino, CA (US); Srinivasan Nimmala, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/991,340

(22) Filed: May 29, 2018

(65) Prior Publication Data

US 2019/0373553 A1 Dec. 5, 2019

(51) Int. Cl.
*H04W 52/02* (2009.01)
*H04W 52/28* (2009.01)
*H04W 36/32* (2009.01)
*H04W 52/20* (2009.01)

(52) U.S. Cl.
CPC ....... *H04W 52/0254* (2013.01); *H04W 36/32* (2013.01); *H04W 52/0264* (2013.01); *H04W 52/20* (2013.01); *H04W 52/283* (2013.01); *H04W 52/285* (2013.01)

(58) Field of Classification Search
CPC . H04W 52/00; H04W 52/02; H04W 52/0209; H04W 52/0225; H04W 52/0229; H04W 52/0251; H04W 52/0254; H04W 64/00; H04W 64/003; H04M 1/7253; Y02D 70/00
USPC .......... 455/456.1, 574, 343.1, 343.2
See application file for complete search history.

(56) References Cited

U.S. PATENT DOCUMENTS 9,055,482 B1 * 6/2015 Singh .................... H04W 28/16

* cited by examiner

*Primary Examiner* — Philip Sobutka
(74) *Attorney, Agent, or Firm* — Fay Kaplun & Marcin, LLp (57) ABSTRACT

A device, system, and method detect an activity and utilize a mitigation scheme. The method is performed at a device that is configured to establish a network connection to a network, the network including a plurality of areas, each area being defined based on a grouping of a plurality of neighboring cells, the device being associated with one of the areas at a select time. The method includes determining between an activity status and a non-activity status associated with the device. When the activity status is determined, the method includes determining an area update rate indicating a number of changes to the associated area over a period of time. When the area update rate exceeds a predetermined update rate threshold, the method includes selecting a mitigation scheme configured to reduce an amount of power used by the device.

20 Claims, 3 Drawing Sheets

POWER REDUCTION IN ACTIVITY MONITOR BASED ON AREA UPDATE

BACKGROUND INFORMATION

A user equipment (UE) may be configured to establish a connection to at least one of a plurality of different networks or types of networks as well as with other UEs to perform a variety of different functionalities via the connection. For example, the UE may connect to a first type of network (e.g., Long Term Evolution (LTE) network) to communicate with another UE through the network connection (e.g., a user of the UE may perform a voice call or transmit a text to another user of another UE). In another example, the UE may connect to a second type of network (e.g., WiFi network) to receive browser data at a higher rate of data exchange. In a further example, the UE may directly connect to a further UE using a short-range communication protocol (e.g., BlueTooth).

When the UE is mobile, the UE may be utilized in various different locations while the user of the UE is performing any of a variety of different activities. For example, the user of the UE may be performing a workout, an exercise, a physical action, etc. (hereinafter collectively referred to as an "activity") while the UE is kept on the person of the user or is worn by the user. The UE may be configured to enable the user to track progress of performing the activity. For example, the UE may track a distance traveled, a time spent, body measurements, etc. However, during the activity, the UE may be exposed to conditions where a network coverage may become poor or become relatively weak (falling below a quality threshold but greater than a quality threshold for poor network coverage). For example, the user may be located in a remote area where cellular coverage may be relatively weak compared to a city center. In another example, the user may be located in an area where area updates or other network events (e.g., radio link failures, out of service indications, etc.) are experienced at a higher rate. The UE may perform a variety of operations to compensate for the weak network coverage. These operations lead to a higher than usual battery drain and a poor user experience.

SUMMARY

The exemplary embodiments are directed to a method of detecting an activity and utilizing a mitigation scheme. The method is performed at a device that is configured to establish a network connection to a network where the network includes a plurality of areas and each area is defined based on a grouping of a plurality of neighboring cells. The device is associated with one of the areas at a select time. The method includes determining between an activity status and a non-activity status associated with the device. When the activity status is determined, the method includes determining an area update rate indicating a number of changes to the associated area over a period of time. When the area update rate exceeds a predetermined update rate threshold, the method includes selecting a mitigation scheme configured to reduce an amount of power used by the device.

The exemplary embodiments are directed to a device detecting an activity and utilizing a mitigation scheme. The device includes a transceiver and a processor. The transceiver is configured to establish a network connection to a network where the network includes a plurality of areas and each area is defined based on a grouping of a plurality of neighboring cells. The device is associated with one of the areas at a select time. The processor determines between an activity status and a non-activity status associated with the device. When the activity status is determined, the processor determines an area update rate indicating a number of changes to the associated area over a period of time. When the area update rate exceeds a predetermined update rate threshold, the processor selects a mitigation scheme configured to reduce an amount of power used by the device The exemplary embodiments are directed to a method for detecting an activity and utilizing a mitigation scheme. The method is performed at a device that is configured to establish a network connection to a network where the network includes a plurality of areas and each area is defined based on a grouping of a plurality of neighboring cells. The device is associated with one of the areas at a select time. The method includes determining between an activity status and a non-activity status associated with the device. When the activity status is determined, the method includes determining whether a network coverage for the device is weak based on an area update rate. The area update rate indicates a number of changes to the associated area over a period of time. The weak network coverage is defined as being below a first predetermined quality threshold and above a second predetermined quality threshold. The first predetermined quality threshold is associated with a strong network coverage where the device is not prevented from performing select operations. The second predetermined quality threshold is associated with a poor network coverage where the device is prevented from performing select operations. The method includes verifying that the network coverage is weak based on a radio link failure (RLF) rate, a cell reselection rate, an out of service (OOS) indication rate, or a combination thereof where the RLF rate indicates a number of RLFs occurring over the period of time, the cell reselection rate indicates a number of cell reselections occurring over the period of time, and the OOS indication rate indicates a number of OOS indications over the period of time. When the network coverage verified as weak, the method includes utilizing a mitigation scheme configured to reduce an amount of power used by the device.

DETAILED DESCRIPTION

The exemplary embodiments may be further understood with reference to the following description and the related appended drawings, wherein like elements are provided with the same reference numerals. The exemplary embodiments are related to a device, system, and method for determining when an activity is being performed by a user who has a user equipment (UE) and identifying when the activity results in a quality of network coverage falling below a predetermined quality threshold (hereinafter referred to as the network coverage being "weak"). While the user is performing the activity, the UE may be exposed to an environment where one or more factors cause a network coverage to become weak. Accordingly, the exemplary embodiments provide a mechanism to determine operations to be performed when the activity is detected on the UE and conditions experienced by the UE is indicative of weak network coverage. When the weak network coverage is determined, the exemplary embodiments further provide a mitigation scheme to be used to mitigate consequences of the weak network coverage.

Initially, it is noted that the exemplary embodiments are described with regard to a UE. However, the UE is only exemplary. The exemplary embodiments may be utilized with any device that may establish one or more connections as well as one or more types of connections (e.g., to a network, to a device, etc.) as well as be configured with the hardware, software, and/or firmware to establish one or more connections. Therefore, the UE as described herein is used to represent any device capable of establishing these connections.

It is further noted that the exemplary embodiments are described when the activity results in the UE being located in a relatively remote location. For example, the exemplary embodiments are directed to when a user goes hiking. However, the activity being hiking is only exemplary. The exemplary embodiments may be utilized or modified for any activity that places the UE in a remote location relative to an operating area of a network. As will be described in further detail below, when the activity is not hiking or a similar activity, the exemplary embodiments may perform different operations to reach a substantially similar result. Specifically, the exemplary embodiments may perform corresponding operations based on the type of activity to determine whether the mitigation scheme is to be used or not. In addition, the remote location may also relate to when the conditions of the UE result in weak network coverage. For example, the UE may also be within a building or in a different medium (e.g., submerged in water) that may result in weak network coverage. The exemplary embodiments may also be implemented for scenarios in which the UE is in any location (e.g., remote or otherwise) that results in weak network coverage.

As used herein, there may be varying degrees of quality related to network coverage. As those skilled in the art will understand, there may be a threshold quality below which the network coverage is determined to be poor. Conventional approaches utilize this threshold quality to utilize mitigation mechanisms such as an emergency mode. When the network coverage is greater than the threshold quality, the conventional approaches may enable operations to be used without mitigation. The exemplary embodiments further define a weak quality that is above the poor quality but less than a further threshold quality where the network coverage may be determined to be strong. Thus, in the exemplary embodiments, there may be two network quality thresholds, a first threshold, below which the network coverage is considered poor and traditional mitigation techniques are applied and a second threshold (greater than the first threshold), above which the network coverage is considered good and no mitigation techniques are used. The exemplary embodiments define a new network quality region between the first and second thresholds, which may be considered the weak quality and where additional mitigation techniques according to the exemplary embodiments may be applied.

A UE may be wearable and provide various functionalities and features. For example, the UE may be worn during an activity to track a user's health or monitor performance during the activity. In another example, the UE may be worn throughout the day to track various health parameters (e.g., calorie burn, steps, etc.). The mobility of the UE may place the UE in various environments where network coverage may be strong, poor, and any intermediary quality such as weak. For example, while hiking, running, cycling, riding off-road vehicles, etc., the UE may move toward a periphery of a network operating area (e.g., a remote location) where the network coverage becomes weak. In another example, while performing an activity indoors (e.g., a gym, a pool, etc.), the location may be substantially shielded where signals from the network may have difficulty in reaching the UE inside the location. In a further example, the activity may entail increased movement that may cause the UE to rapidly move between coverage areas of different cells or tracking areas. Accordingly, the activity may place the UE in a scenario or area where network coverage is weak that leads to an increased usage of power (e.g., at a baseband side) from a limited power supply of the UE relative to when the network coverage is strong.

With particular regard to hiking as the activity, conventional approaches do not provide a mechanism to autonomously detect when the user with the UE is performing a commonplace outdoor activity such as hiking. Thus, when the user goes hiking and the UE is located on a remote trail relative to a network standpoint, there is a severe degradation of battery life because of excessive signaling and/or weak RF conditions. For example, there may be an average battery drain for a standard UE with a standard battery of 30% per hour. The user may also go hiking in a remote location where the hiking trail lies at edges of one or more tracking, routing, or location areas (depending on the network). Thus, there may be area updates that occur at a high frequency. For example, in one use case involving a UE that was with a hiker, it was determined that the UE experienced area updates approximately 51 times per hour. Other network events associated with the hiking trail and remote location may include out of service to in service transitions (e.g., 83 times per hour), cell reselections (e.g., 25 times per hour), radio link failures (e.g., 7 times per hour), etc. The increased activity and operations that are performed because the UE has weak network coverage in the remote location increases the power being drawn from the battery of the UE. However, the network coverage may still rise above the standard to determine poor network coverage which prevents conventional mitigation mechanisms from being used.

In view of the weak network coverage that a UE may experience when a user of the UE goes hiking, especially on a remote hiking trail, the exemplary embodiments provide a mechanism to initially determine when the user has gone hiking and subsequently determining whether the user hiking results in the UE having weak network coverage to warrant use of a mitigation scheme. As will be described in further detail below, the UE being with a user who is hiking may be determined using available sensor information including movement information and location information. A positive identification that the user with the UE is hiking may increase the likelihood that the UE may experience weak network coverage. Thus, the exemplary embodiments may determine that the hiking activity also results in the weak network coverage based on network events and rates of occurrence prior to any mitigation scheme being imposed. When the user is hiking and the UE is experiencing weak network coverage, the exemplary embodiments may take further action by instituting a mitigation scheme which is an aggressive action to preserve battery while maintaining connectivity (when applicable).

Figure 1:
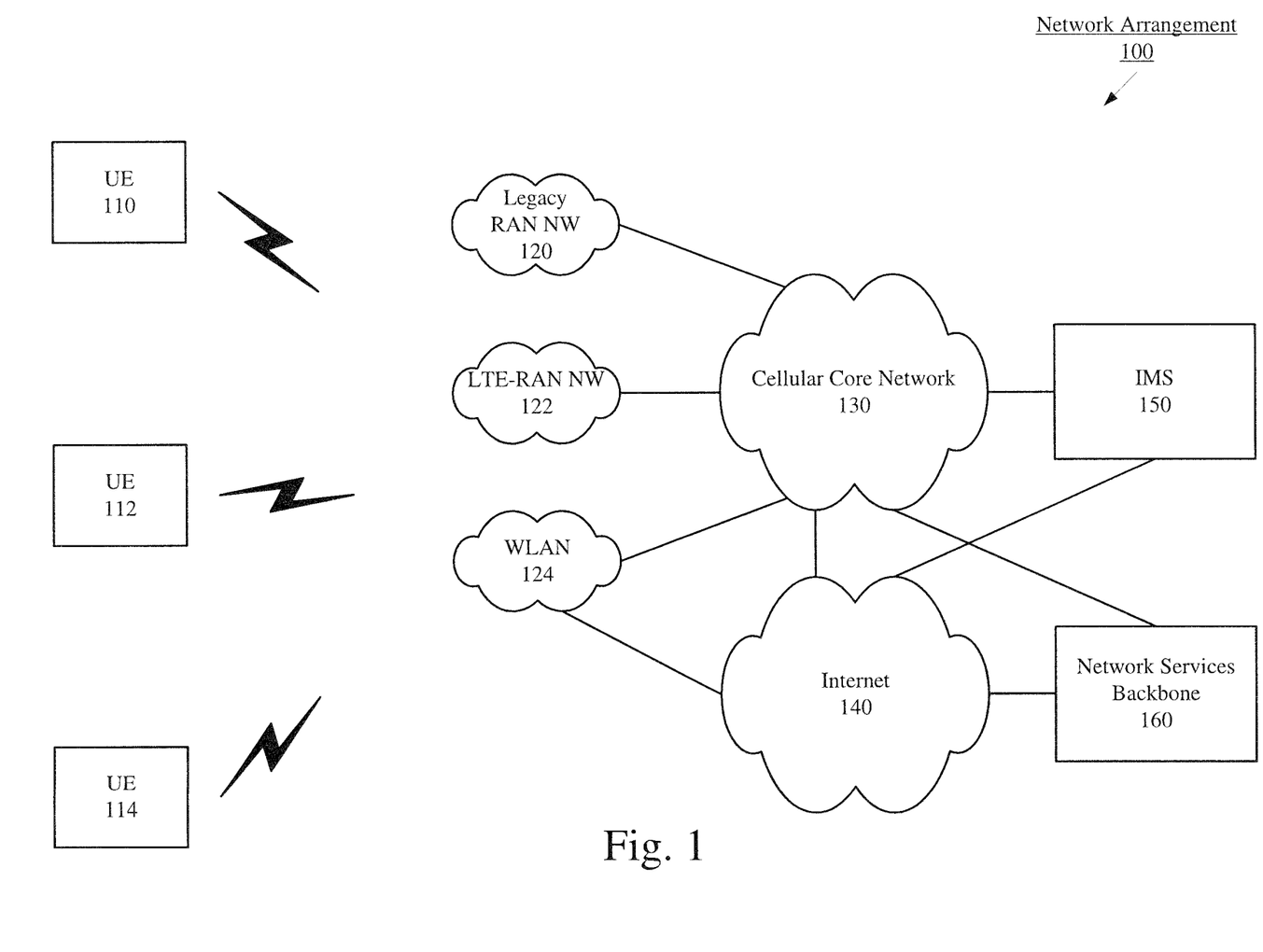
FIG. 1 shows an example network arrangement according to various exemplary embodiments described herein.

FIG. 1 shows a network arrangement 100 according to the exemplary embodiments. The network arrangement 100 includes UEs 110-114. Those skilled in the art will understand that the UEs 110-114 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. It should also be understood that an actual network arrangement may include any number of UEs being used by any number of users and being associated with any number of these users where the user may be associated with one or more of the UEs. That is, the example of three (3) UEs 110-114 is only provided for illustrative purposes.

Each of the UEs 110-114 may be configured to communicate directly with one or more networks. In this example, the networks with which the UEs 110-114 may wirelessly communicate are a legacy radio access network (RAN) 120 (e.g., a 3G network, a WCDMA network, a UMTS network, etc.), a LTE RAN (LTE-RAN) 122, and a wireless local area network (WLAN) 124 (e.g., a WiFi network). However, it should be understood that the UEs 110-114 may also communicate with other types of networks (e.g., 5G networks, etc.). With regards to the exemplary embodiments, in a particular implementation, the UEs 110-114 may establish a connection with one or more of the legacy RAN 120, the LTE-RAN 122, and the WLAN 124. For example, the UEs 110-114 may have a legacy chipset, a LTE chipset, and/or a WiFi chipset that are used to communicate with the legacy RAN 120, the LTE-RAN 122, and/or the WLAN 124, respectively. The use of three (3) networks is only exemplary and there may be any other number of networks with which the UEs 110-114 may communicate.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base client stations (Node Bs, eNodeBs, HeNBs, gNBs, etc.) that are configured to send and receive traffic from UEs that are equipped with the appropriate cellular chip set. The WLAN 124 may include any type of wireless local area network (e.g., WiFi, Hot Spot, IEEE 802.11x networks, etc.).

In addition to the networks 120-124, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UEs 110-114 using the IP protocol. The IMS 150 may communicate with the cellular core network 130 and the Internet 140 to provide the multimedia services to the UEs 110-114. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110-114 in communication with the various networks. The network services backbone 160 may interact with the UEs 110-114 and/or the networks 120, 122, 124, 130, 140 to provide these extended functionalities.

Figure 2:
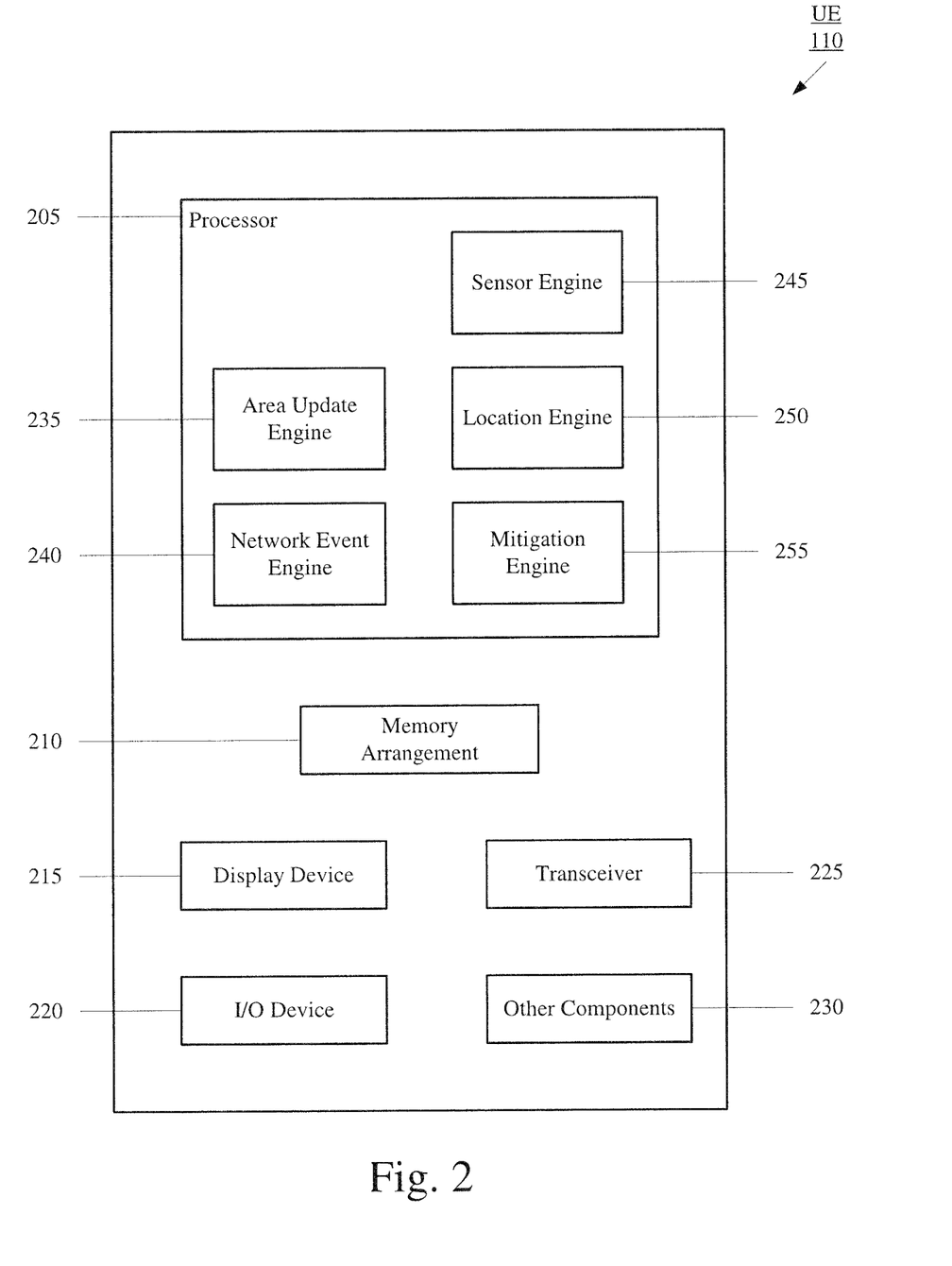
FIG. 2 shows an example user equipment according to various exemplary embodiments described herein.

The exemplary embodiments relate to the UE 110 determining when the user with the UE 110 is hiking which results in the UE 110 having weak network coverage. The exemplary embodiments subsequently institute a mitigation scheme to perform corresponding operations to preserve battery life. FIG. 2 shows the UE 110 of the network arrangement 100 of FIG. 1 according to the exemplary embodiments. The UE 110 is configured to execute a plurality of engines that perform functionalities to address scenarios when a user with the UE 110 is hiking and is in a location where the UE 110 has weak network coverage. It is noted that the UE 110 being configured with the features of the exemplary embodiments is only exemplary. That is, the UE 110 may also represent the UEs 112, 114.

The UE 110 may represent any electronic device that is configured to perform wireless functionalities and may be representative of one or more of the UEs 110-114 (examples of which are noted above). The UE 110 may include a processor 205, a memory arrangement 210, a display device 215, an input/output (I/O) device 220, a transceiver 225, and other components 230. The other components 230 may include, for example, sensors to detect movement and movement related data, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines of the UE 110. For example, the engines may include an area update engine 235, a network event engine 240, a sensor engine 245, a location engine 250, and a mitigation engine 255. The area update engine 235 may be configured to detect when and how often area updates are occurring for the UE 110. The network event engine 240 may be configured to detect when and how often various types of network events are occurring for the UE 110. The sensor engine 245 may be configured to receive sensor data from sensors of the UE 110 to determine an activity status of the user with the UE 110. The location engine 250 may be configured to determine a global location of the UE 110. The mitigation engine 255 may be configured to institute a mitigation scheme based on outputs from the engines 235-250. It is noted that the processor 205 may execute further engines, select ones of which are described below.

It should be noted that the above noted engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications or as part of one or more multifunctional programs. Accordingly, the applications may be implemented in a variety of manners in hardware, software, firmware, or a combination thereof. In addition, in some UEs, the functionality described for the processor 205 is split among two or more processors such as a baseband processor and an applications processor, as will be described in further detail below. The exemplary embodiments may be implemented in any of these or other configurations of a UE.

The memory 210 may be a hardware component configured to store data related to operations performed by the UE 110. As will be described in further detail below, the memory 210 may store data associated with movement and other sensory information as well as data associated with network measurements and network events. The display device 215 may be a hardware component configured to show data to a user while the I/O device 220 may be a hardware component that enables the user to enter inputs. It should be noted that the display device 215 and the I/O device 220 may be separate components or integrated together such as a touchscreen. The transceiver 225 may be a hardware component configured to establish a connection with at least one of a base station associated with the legacy RAN 120, a base station of the LTE-RAN 122 (e.g., an evolved Node B (eNB)), a router of a WLAN 124, the UE 112, etc. Accordingly, the transceiver 225 may operate on a variety of different frequencies or channels (e.g., set of consecutive frequencies).

As described above, the area update engine 235 may detect when and how often area updates are occurring on the UE 110. The area update may refer to changes in different areas that are categorized based on a grouping of neighboring base stations or cells of the network. For example, in an idle state, the area may provide a general location of the UE 110. In an exemplary embodiment, there may be a plurality of areas such as a first area that may include cells in a first zone, a second area that may include cells in a second zone, etc. Using these defined areas with respective cells, the network may be aware of the general location of the UE 110 based on the area such that the network is enabled to contact the UE 110 while in the idle state by using the cells in the area to page the UE 110 in an attempt to wake the UE 110.

The areas may have known, respective geographic areas and be positioned in adjacent locations. Thus, the UE 110 may be positioned within a first area, traverse beyond a boundary of the first area, and enter a second area. This process may continue as the UE 110 traverses boundaries of areas. The UE 110 may traverse into unique areas or may re-enter previously located areas. The area update engine 235 may detect whenever a change in area occurs. In this manner, the area update engine 235 may track the area updates. The area update engine 235 may also track a number of area updates within a given time period. As will be described below, a rate of the area updates may provide an indication to the mitigation engine 255. The rate of the area updates may be compared to a predetermined area update threshold. Thus, when the area update engine 235 detects a number of area updates within a given time period exceeds the predetermined area update threshold, the area update engine 235 may provide a corresponding output to the mitigation engine 255. The number of area updates may be indicative of the network coverage quality. For example, as used herein, the weak network coverage may be indicated by at least the number of area updates exceeding the predetermined area update threshold.

The predetermined area update threshold may be set based on different standards. In a first example, the predetermined area update threshold may be applied generally to each UE when the mechanism according to the exemplary embodiments is used. Thus, regardless of an identity of the UE, when area updates are being tracked, a universal predetermined area update threshold may be used as the basis upon which to generate the corresponding output to the mitigation engine 255. In an exemplary embodiment, the predetermined area update threshold may be 4 area updates in 20 minutes. It is noted that since the exemplary embodiments are described with reference to weak network coverage, the predetermined area update threshold may be selected to be less than a corresponding threshold that may be used to indicate poor network coverage. In a second example, the predetermined area update threshold may be applied locally to a specific UE when the mechanism according to the exemplary embodiments is used. Thus, depending on an identifying characteristic, a respective predetermined area update threshold may be used as the basis upon which to generate the corresponding output to the mitigation engine 255. For example, the predetermined area update threshold may be based on a learning algorithm for a given UE (e.g., UEs with updated capabilities may utilize a higher predetermined area update threshold than UEs using outdated hardware/software/firmware), a given geographic location (e.g., areas with denser cells and smaller geographic areas may utilize a higher predetermined area update threshold), or a combination thereof (e.g., a cell of an area may provide a standard predetermined area update threshold to which the UE may apply a modification based on historical performance information). In this manner, the predetermined area update threshold may be selected locally or may be dynamically adjusted.

For illustrative purposes, the area update as described herein may be a tracking area update (TAU). As those skilled in the art will understand, the TAU may be used with regard to the LTE-RAN 122. Thus, the cells in a given tracking area may be eNBs. However, the use of the TAU is only exemplary. The exemplary embodiments may be used with other area updates and corresponding networks. For example, the area update may be a location area update. As those skilled in the art will understand, the location area update may be used with a Global System for Mobile Communications (GSM) network or a Universal Mobile Telecommunications System (UMTS) network. In another example, the area update may be a routing area update. As those skilled in the art will understand, the routing area update may be an equivalent to the location area update as used in a packet-switched domain. Accordingly, the exemplary embodiments may utilize tracking area updates, routing area updates, location area updates, a combination thereof, etc.

The network event engine 240 may detect when and how often various types of network events are occurring for the UE 110. There may be a variety of different types of network events that may be tracked by the network event engine 240. The network events may also be indicative of a quality of the network coverage. For example, the network events may include radio link failures (RLFs), cell reselections, out of service (OOS) indications, etc. Based on measurements and other available information (e.g., from the baseband processor) using known mechanisms, the network event engine 240 may track each time a particular network event is experienced.

The network event engine 240 may also track a number of each type of network event within a given time period. As will be described below, a rate of a given network event may provide an indication to the mitigation engine 255. The rate of a given network event may be compared to a corresponding predetermined network event threshold. Thus, when the network event engine 240 detects a number of a given network events within a given time period exceeds the corresponding predetermined network event threshold, the network event engine 240 may provide a corresponding output to the mitigation engine 255.

Each of the predetermined network event thresholds may be set based on different standards in a substantially similar manner as the predetermined area update threshold. Accordingly, the predetermined network event threshold may be applied generally for each UE or locally/dynamically based on one or more identifying characteristics. In an exemplary embodiment, the predetermined RLF threshold may be 2 RLFs in 20 minutes; the predetermined cell reselection threshold may be 6 reselections in 20 minutes; and the predetermined OOS indication threshold may be 4 indications in 20 minutes. It is noted that since the exemplary embodiments are with regard to weak network coverage, the predetermined network event thresholds may be selected to be less than a corresponding threshold that may be used to indicate poor network coverage.

The location engine 250 may be configured to determine a global location of the UE 110. The location of the UE 110 may provide information with regard to an activity status associated with the UE 110 such as whether a user with the UE 110 is hiking. The location engine 250 may utilize any known location mechanism to determine where the UE 110 is globally located (e.g., latitude and longitude). For example, the location engine 250 may receive a location from a remote source that determines the location of the UE 110. In another example, the location engine 250 may utilize global positioning system (GPS) data, triangulation data, signal strength data, network detection data, etc. As will be described in further detail below, the location may be outputted from the location engine 250 to the mitigation engine 255 as a further basis upon which to determine whether a mitigation scheme is to be used.

The sensor engine 245 may be configured to receive sensor data from sensors of the UE 110 to determine an activity status of the user with the UE 110. As noted above, the other components 230 may include various types of sensors that generate sensor data or configured to receive information to determine sensor data. For example, the sensor data may be associated with an altitude, a barometer, etc. In another example, the sensor data may be associated with movement measured for the user of the UE 110. Specifically, the sensor data may track steps from an always on processor (AOP). Thus, while the user is hiking, the steps may be tracked over a period of time.

The sensor engine 245 may also track a change in the sensor data within a given time period. As will be described below, a rate of change in an altitude reading, a barometer reading, etc. may provide an indication to the mitigation engine 255. The rate of change for a given sensor reading may be with regard to a corresponding predetermined sensor threshold. Thus, when the sensor engine 245 detects a change in the sensor data within a given time period that exceeds the corresponding predetermined sensor threshold, the sensor engine 245 may provide a corresponding output to the mitigation engine 255. The change in the sensor data may be indicative of an activity status associated with the UE 110. For example, an altitude reading that changes (e.g., as an absolute value) more than a predetermined altitude threshold may indicate that the UE 110 may be elevating or descending which may be indicative of an elevated hiking trail. In another example, a barometer reading that changes (e.g., as an absolute value) more than a predetermined barometer threshold may indicate that the UE 110 may be elevating or descending which may be indicative of a hiking trail on a mountain.

A step reading may also provide an indication to the mitigation engine 255. Thus, the sensor engine 245 may track this type of sensor data over a period of time. Accordingly, when the step reading exceeds a predetermined sensor threshold, further information may be deduced with regard to an activity status may be determined for the UE 110. Thus, when the sensor engine 245 detects the step reading exceeds the predetermined sensor threshold, the sensor engine 245 may provide a corresponding output to the mitigation engine 255.

Each of the predetermined sensor thresholds may be set based on different standards in a substantially similar manner as the predetermined area update threshold and the predetermined network event threshold. Accordingly, each of the predetermined sensor thresholds may be applied generally for each UE or locally/dynamically based on one or more identifying characteristics. In an exemplary embodiment, the predetermined altitude threshold may be 50 distance units (e.g., feet) in 20 minutes; the predetermined barometer threshold may be 1% pressure change in 20 minutes; and the predetermined step threshold may be 400 steps over a period of 5 minutes.

As noted above, the processor 205 may be configured to execute further engines. For example, the processor 205 may include a status engine to determine an activity status indicating whether the user of the UE 110 is performing an activity such as hiking as well as whether the activity is being performed or has concluded. As those skilled in the art will understand, a status engine may be capable of determining the activity status utilizing a plurality of different mechanisms (e.g., manual or automated). When manually determined, the user may utilize an activity application installed on the UE 110 to manually identify the activity status. Thus, the user may enter an input that indicates that the user has or will start hiking. While the user is hiking, the activity application tracks a progress of the activity being performed and vital statistics of the user (e.g., may receive the step reading from the AOP). When automatically determined, the user may begin the activity and sensor data (e.g., based on the sensors determining the altitude and barometer) as well as other sensor data may be used to implicitly detect when an activity starts/ends. An identity of the activity may also be determined such as hiking (e.g., when an altitude change over a period of time is detected).

Although the status engine may provide an indication of the activity status to the mitigation engine 255, the exemplary embodiments may utilize this activity status indication in a manner substantially similar to the other outputs of the sensor engine 245 with regard to the activity status. That is, according to the exemplary embodiments, the indication of an activity status (versus a non-activity status) does not necessitate that a mitigation scheme is to be used. Instead, the activity status may have a higher probability (than the non-activity status) that the network coverage may be weak for the mitigation scheme to be instituted. Accordingly, the exemplary embodiments may treat an indication of an activity status from a status engine as further information to be considered in determining whether the mitigation scheme is to be used.

In an exemplary manner of utilizing the outputs of the area update engine 235, the network event engine 240, the sensor engine 245, and the location engine 250, the mitigation engine 255 may determine whether the mitigation scheme is to be used. In performing this functionality, the mitigation engine 255 may initially determine whether the user with the UE 110 is hiking. As described above, the sensor engine 245 may generate different types of sensor data including step data while the location engine 250 may determine a global location of the UE 110. In an exemplary process, the mitigation engine 255 may determine whether the step data provided by the sensor engine 245 from information received from the AOP indicates that the user is hiking. Thus, when the step data indicates a step reading that exceeds the predetermined step threshold, the mitigation engine 255 may determine that the user may be hiking and proceed to further determinations. In contrast, when the step data indicates a step reading that is less than the predetermined step threshold, the mitigation engine 255 may determine that the user is not hiking. If the mitigation engine 255 determines that the user is not hiking, the mitigation engine 255 may determine that the mitigation scheme may not be used under the current conditions.

The mitigation engine 255 may subsequently determine whether the other sensor data and the location data indicate or confirm that the user is hiking. For example, the user may still be in an urban environment and walking to a particular destination in such a way that the predetermined step threshold is exceeded. However, the user may not be hiking. Thus, the other sensor data (e.g., altitude change, barometer change, etc.) may confirm whether the user is actually hiking. In this example, a combination of the step data exceeding the predetermined step threshold along with the altitude data, the barometer data, or a combination thereof may lead to the mitigation engine 255 determining the user is hiking. Although the sensor data and the location data individually may not definitively identify when the user is hiking (e.g., an altitude change may be due to the user being in an elevator, a global location may be in a remote zone but the user may not be moving, etc.), a consideration from a combination of the sensor data (e.g., step data with altitude data and barometer data) may provide a confident determination (e.g., above a predetermined activity threshold) that the user is hiking. When the sensor data indicates a reading that exceeds the corresponding predetermined sensor threshold or the location data indicates a global location that has a sufficient likelihood of the activity status, the mitigation engine 255 may determine that the user is likely hiking and proceed to further determinations. In contrast, when the sensor data, the location data, or a combination thereof indicates that the user is not hiking, the mitigation engine 255 may determine that the mitigation schemes may not be used under the current conditions.

It is again noted that the activity being hiking is only exemplary. Activities involving steps of the user (e.g., walking, running, hiking, etc.) may utilize sensor data such as the step data described above. However, there may be other activities that are being performed that may not utilize step data (e.g., swimming, vehicle riding, etc.). These other activities may utilize other available sensor data. For example, when the activity is water based, sensor data associated with the UE 110 being submerged may be used. In another example, when the activity is riding a vehicle, sensor data associated with a speed may be used. Accordingly, the UE 110 may be configured with further sensors or have access to other information to generate this sensor data. When a particular predetermined combination of sensor data is detected, the identity of the activity may be determined (e.g., for swimming, the location is within a body of water, sensor data indicates a swimming motion of the arms of the user, sensor data indicates the UE 110 being submerged, sensor data indicates an increased pressure, etc.). Accordingly, the sensor data using step data is only exemplary and use of the step data is directed to activities involving the user performing steps.

When the activity status is detected, there may be a higher likelihood that the mitigation scheme may be used. Thus, the mitigation engine 255 may utilize the outputs from the area update engine 235 and the network event engine 240 to determine a quality of network coverage. As noted above, the area updates may provide an initial consideration as to whether the network coverage is weak. Thus, the mitigation engine 255 may first receive the output from the area update engine 235. When the output from the area update engine 235 indicates that the rate at which the area updates are occurring does not exceed the predetermined area update threshold, the mitigation engine 255 may determine that the quality of the network coverage is at least a predetermined minimum quality. Accordingly, the mitigation engine 255 may determine that the mitigation scheme may not be used under the current conditions. However, when the rate of area updates exceeds the predetermined area update threshold, the mitigation engine 255 may determine that the quality of the network coverage does not meet the predetermined minimum quality. Thus, the mitigation engine 255 proceeds to further operations.

The further operations that the mitigation engine 255 performs may be instituting the mitigation scheme, as described in further detail below. However, the mitigation engine 255 may further consider the output from the network event engine 240 to verify or utilize an additional criteria in determining that the network coverage is weak. For example, the output from the network event engine 240 may identify a rate at which RLFs are occurring, a rate at which cell reselections are occurring, a rate at which OOS indications are being experienced, a combination thereof, etc. Thus, when the mitigation engine 255 identifies that the network coverage may be weak based on the area updates, the mitigation engine 255 may confirm that the network coverage is weak using the above noted or other network events. In a particular exemplary embodiment, the mitigation engine 255 may consider the RLFs as an additional criteria. Thus, when a rate of the RLFs exceeds the predetermined RLF threshold, the mitigation engine 255 may determine that the network coverage is weak and that the mitigation scheme may be used. In contrast, when the rate of the RLFs is less than the predetermined RLF threshold, the mitigation engine 255 may determine that the mitigation scheme may not be used under the current conditions. The mitigation engine 255 may also consider at least one of the cell reselections and the OOS indications as an additional criteria. Thus, when a rate of at least one of the cell reselections and the OOS indications exceeds the predetermined cell reselection threshold and the OOS indication threshold, respectively, the mitigation engine 255 may determine that the network coverage is weak and that the mitigation scheme may be used. In contrast, when the rate of both the cell reselections and the OOS indications is less than the predetermined cell reselection threshold and the predetermined OOS indication threshold, the mitigation engine 255 may determine that the mitigation scheme may not be used under the current conditions. In this manner, in a first pathway, the mitigation engine 255 may determine that the area updates exceed the predetermined area update threshold and the RLFs exceed the predetermined RLF threshold to determine that the mitigation scheme is to be used. In a second pathway, the mitigation engine 255 may determine that the area updates exceed the predetermined area update threshold and either the cell reselections exceed the predetermined cell reselection threshold, the OOS indications exceed the predetermined OOS indication threshold, or both these network events exceed the corresponding threshold to determine that the mitigation scheme is to be used. In a third pathway, the mitigation engine 255 may utilize the area update basis, the RLF basis, and at least one of the cell reselection basis and the OOS indication basis. It is noted that, in addition to the examples provided above, there may be other manners of determining that the weak network conditions exist based on different network events and/or different combinations of network events.

When the mitigation engine 255 has identified that the mitigation scheme is to be used, the mitigation engine 255 may institute the mitigation scheme to modify how UE operations are to be performed. The mitigation engine 255 may institute a plurality of different mitigation schemes or a combination thereof. As will be described in further detail below, the mitigation schemes may include a power reserve mode, an emergency mode, a selective disable/enable mode, an area selection mode, or a combination thereof. The power reserve mode may be a low power mode (e.g., airplane mode). However, the power reserve mode may maintain power to the baseband. The emergency mode may be when only emergency services are enabled (e.g., a Commercial Mobile Alert System (CMAS) mode). It is noted that the emergency mode may also enable user-initiated operations (e.g., outgoing calls). The selective disable/enable mode may select a first set of operations/functionalities that remain enabled and a second set of operations/functionalities that are disabled. For example, cellular data operations may be disabled while cellular voice operations may remain enabled.

The area selection mode may be a process directed to predictive cell reselection. For example, historical area change information may provide a basis to bias cell selection. For example, when a hiker is hiking and moves from a first tracking area, to a second tracking area, back to the first tracking area, back to the second tracking area, back to the first tracking area, etc., the area selection mode may bias the first tracking area so that a cell in the first tracking area is used for cell selection, even if that cell is not in the current tracking area. This cell selection bias may be used because the historical data indicates that even though the UE is not currently in the first tracking area, it is highly likely to return to the first tracking area shortly. Also, since the cell from the first tracking area was selected and the user is hiking, meaning they are not moving at a great speed, it is likely the cell from the first tracking area will still have sufficient signal when the user is in the second tracking area. In this manner, the UE may save the power and signaling associated with multiple cell reselections as the tracking areas are updated.

It is noted that the mitigation scheme may also be instituted based on a remaining available power. For example, when the remaining available power is less than a percentage of a total available power, the mitigation engine 255 may institute the mitigation scheme (when the other above described conditions have been met). However, when the remaining available power is greater than the percentage of the total available power, the mitigation engine 255 may select to omit use of the mitigation scheme (even when the other above described conditions have been met).

The exemplary embodiments are described above with regard to initially determining an activity status, subsequently determining whether the activity status results in weak network coverage where a number of area updates exceeds a predetermined threshold, and utilizing a mitigation scheme when there is weak network coverage. However, the determining of the activity status is only exemplary. That is, the determining of the activity status may represent any preliminary determination that leads to determining the area updates in identifying a quality of the network coverage. Thus, the exemplary embodiments may be modified to incorporate other types of preliminary determinations that trigger determining the network coverage and area updates.

Figure 3:
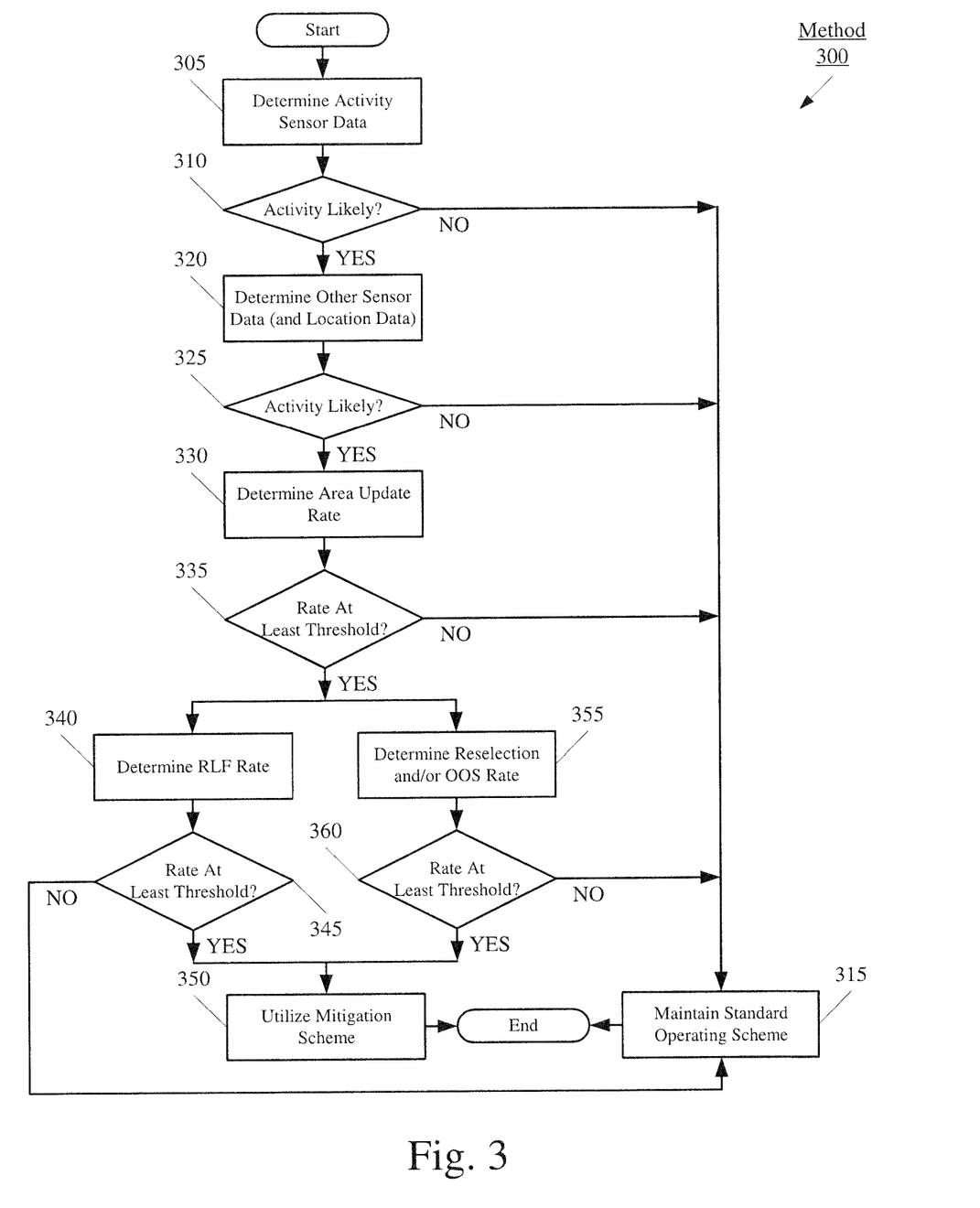
FIG. 3 shows an exemplary method for utilizing a mitigation scheme during an activity according to various exemplary embodiments described herein.

FIG. 3 shows an exemplary method 300 for utilizing a mitigation scheme during an activity according to various exemplary embodiments described herein. The activity may position the UE 110 in an environment where network coverage may be weak (e.g., less than a strong network coverage but greater than a poor network coverage) resulting in increased power usage from performing various network operations relative to a strong network coverage. Thus, the method 300 is configured to determine when the network coverage becomes weak while the activity status is determined and to subsequently institute a mitigation scheme. The method 300 may be performed by the area update engine 235, the network event engine 240, the sensor engine 245, the location engine 250, the mitigation engine 255, and/or other components of the UE 110. The method 300 will be described with regard to the network arrangement 100 of FIG. 1 and the UE 110 of FIG. 2.

In 305, the UE 110 determines an activity status associated with the UE 110. As described above, the activity status may be determined based on outputs from the sensor engine 245. For example, step data as received from an AOP may be provided to the sensor engine 245 that generates the output for the mitigation engine 255. Thus, in 310, the UE 110 may determine if the activity status is above a predetermined likelihood threshold. When the step data indicates that the activity status is less than the predetermined likelihood threshold, the method continues to 315 where a standard operating scheme is maintained. For example, mitigations may not be used and operations/functionalities of the UE 110 may be enabled. However, when the step data indicates that the activity status is at least the predetermined likelihood threshold, the method continues to 320.

In 320, the UE 110 further determines the activity status associated with the UE 110. As described above, the activity status may be further determined based on outputs from the sensor engine 245 and the location engine 250. In addition, when an activity application is installed, an input received through the activity application may also be used. Thus, in 325, the UE 110 may further determine if the activity status is above a further predetermined likelihood threshold. When the sensor data, location data, activity application input, or a combination thereof indicates that the activity status is less than the further predetermined likelihood threshold, the UE 110 continues to 315 where a standard operating scheme is maintained. However, when the sensor data, location data, activity application input, or a combination thereof indicates that the activity status is at least the further predetermined likelihood threshold, the method continues to 330.

It is noted that the two operations of 305 and 320 may be combined into a single joint operation where multiple activity related parameters are evaluated to determine the activity status. In addition, more or different activity operations may be performed in series with the operations 305 and 320 to confirm the activity status of the user of the UE 110.

Once the activity status is determined, the UE 110 may perform further determinations to determine a quality of network coverage based on the current conditions of the UE 110. In 330, the UE 110 determines a rate in which area updates are occurring (e.g., using the area update engine 235). As noted above, the area updates may be for tracking areas (e.g., with the LTE-RAN 122), location areas (e.g., GSM or UMTS), routing areas, etc. In 335, the UE 110 determines whether the area update rate is at least a predetermined area update threshold. When the area update rate is less than the predetermined area update threshold, the method continues to 315 where a standard operating scheme is maintained. However, when the area update rate is at least the predetermined area update threshold, the method continues to 340 and 355.

In 340, the UE 110 determines a rate in which RLFs are occurring (e.g., using the network event engine 240). In 345, the UE 110 determines whether the RLF rate is at least a predetermined RLF threshold. When the RLF rate is less than the predetermined RLF threshold, the method continues to 315 where a standard operating scheme is maintained.

However, when the RLF rate is at least the predetermined area update threshold, the method continues to 350.

In 350, the UE 110 utilizes a mitigation scheme. That is, after 310 and 325 lead to 315, the UE 110 may determine that there is a non-activity status and the mitigation scheme according to the exemplary embodiments is not to be used. After 335 and 345 lead to 315, the UE 110 may determine that the network coverage is strong or at least has a quality greater than weak. Thus, the mitigation scheme according to the exemplary embodiments is not to be used. However, after 345 leads to 350, the network coverage may be determined to be weak. Accordingly, to compensate for increased operations relative to a strong network coverage while the UE 110 is associated with the activity status (e.g., the user is hiking), the mitigation scheme may be utilized (e.g., instituted by the mitigation engine 255). As noted above, the mitigation scheme may be a power reserve mode, an emergency mode, a selective disable/enable mode, an area selection mode, or a combination thereof.

Turning to 355, the UE 110 determines a rate in which cell reselections and/or OOS indications are occurring (e.g., using the network event engine 240). In 360, the UE 110 determines whether the cell reselection rate is at least a predetermined cell reselection threshold or whether the OOS indication rate is at least a predetermined OOS indication threshold. When both of these rates are less than the corresponding predetermined network event threshold, the method continues to 315 where a standard operating scheme is maintained. However, when at least one of these rates is at least the corresponding predetermined network event threshold, the method continues to 350 where the mitigation scheme is utilized. Again, after 360 leads to 350, the network coverage may be determined to be weak for the mitigation scheme to become instituted.

The exemplary embodiments provide a device, system, and method of determining when network coverage is weak while an activity status is determined such as a user with a UE hiking. Using various types of sensor data, location data, and manually provided inputs, the activity status may initially be determined. Thus, while the user is hiking, the network coverage may then be determined based on area update data and other network event data. Specifically, when the area update data indicates that a rate in which area updates are occurring is above a threshold, the network coverage may be determined to be weak. As a further criteria or to confirm this determination, further network events such as a cell reselection rate and/or an OOS indication rate may be used to determine that the network coverage is weak. When the activity status is determined and the network coverage is weak, a mitigation scheme may be used to conserve power on the UE.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made to the present disclosure, without departing from the spirit or the scope of the exemplary embodiments. Thus, it is intended that the present disclosure cover modifications and variations of the exemplary embodiments invention provided they come within the scope of the appended claims and their equivalent.

What is claimed is:

1. A method, comprising:
   at a device that is configured to establish a network connection to a network, the network including a plurality of areas, each area being defined based on a grouping of a plurality of neighboring cells, the device being associated with one of the areas at a select time:
   determining between an activity status and a non-activity status associated with the device;
   when the activity status is determined, determining an area update rate indicating a number of changes to the associated area over a period of time; and
   when the area update rate exceeds a predetermined update rate threshold, selecting a mitigation scheme configured to reduce an amount of power used by the device.

2. The method of claim 1, wherein the determining the activity status is based on one of step data, sensor data, location data, or manually provided data.

3. The method of claim 2, wherein the sensor data includes altitude data or barometer data.

4. The method of claim 1, wherein the network is one of a Long Term Evolution (LTE) network, a Global System for Mobile Communications (GSM) network, a Universal Mobile Telecommunications System (UMTS) network, or a packet-switched domain network.

5. The method of claim 4, wherein, when the network is the LTE network, the area is a tracking area, wherein, when the network is the GSM or UMTS network, the area is a location area, and wherein, when the network is the packet-switched domain network, the area is a routing area.

6. The method of claim 1, further comprising:
   when the area update rate exceeds the predetermined update rate threshold, determining a radio link failure (RLF) rate, the RLF rate indicating a number of RLFs occurring over the period of time,
   wherein the mitigation scheme is selected based, at least in part, on the RLF rate being at least a predetermined RLF threshold.

7. The method of claim 1, further comprising:
   when the area update rate exceeds the predetermined update rate threshold, determining a cell reselection rate or an out of service (OOS) indication rate, the cell reselection rate indicating a number of cell reselections occurring over the period of time, the OOS indication rate indicating a number of OOS indications over the period of time,
   wherein the mitigation scheme is selected based, at least in part, on the cell reselection rate being at least a predetermined cell reselection threshold or the OOS indication rate being at least a predetermined OOS indication threshold.

8. The method of claim 1, wherein the mitigation scheme is one of a power reserve mode, an emergency mode, a selective disable mode, or an area selection mode.

9. The method of claim 8, wherein the selective disable mode selectively disables a number of device operations, while leaving other device operations enabled.

10. The method of claim 1, wherein the activity status is indicative of a user with the device hiking.

11. A device, comprising:
    a transceiver configured to establish a network connection to a network, the network including a plurality of areas, each area being defined based on a grouping of a plurality of neighboring cells, the device being associated with one of the areas at a select time; and a processor determining between an activity status and a non-activity status associated with the device, and when the activity status is determined, determining an area update rate indicating a number of changes to the associated area over a period of time and when the area update rate exceeds a predetermined update rate threshold, selecting a mitigation scheme configured to reduce an amount of power used by the device.

12. The device of claim 11, wherein the processor determines the activity status based on one of step data, sensor data, location data, or manually provided data.

13. The device of claim 12, wherein the sensor data includes one of altitude data or barometer data.

14. The device of claim 11, wherein the network is one of a Long Term Evolution (LTE) network, a Global System for Mobile Communications (GSM) network, a Universal Mobile Telecommunications System (UMTS) network, or a packet-switched domain network.

15. The device of claim 14, wherein, when the network is the LTE network, the area is a tracking area, wherein, when the network is the GSM or UMTS network, the area is a location area, and wherein, when the network is the packet-switched domain network, the area is a routing area.

16. The device of claim 11, wherein, when the area update rate exceeds the predetermined update rate threshold, the processor determines a radio link failure (RLF) rate, the RLF rate indicating a number of RLFs occurring over the period of time, the processor selecting the mitigation scheme based, at least in part, on the RLF rate being at least a predetermined RLF threshold.

17. The device of claim 11, wherein, when the area update rate exceeds the predetermined update rate threshold, the processor determines a cell reselection rate or an out of service (OOS) indication rate, the cell reselection rate indicating a number of cell reselections occurring over the period of time, the OOS indication rate indicating a number of OOS indications over the period of time, the processor selecting the mitigation scheme based, at least in part, on the cell reselection rate being at least a predetermined cell reselection threshold or the OOS indication rate being at least a predetermined OOS indication threshold.

18. The device of claim 11, wherein the mitigation scheme is one of a power reserve mode, an emergency mode, a selective disable mode, or an area selection mode.

19. The device of claim 11, wherein the activity status is indicative of a user with the device hiking.

20. A method, comprising:

at a device that is configured to establish a network connection to a network, the network including a plurality of areas, each area being defined based on a grouping of a plurality of neighboring cells, the device being associated with one of the areas at a select time:

determining between an activity status and a non-activity status associated with the device;

when the activity status is determined, determining whether a network coverage for the device is weak based on an area update rate, the area update rate indicating a number of changes to the associated area over a period of time, the weak network coverage defined as being below a first predetermined quality threshold and above a second predetermined quality threshold, the first predetermined quality threshold associated with a strong network coverage where the device is not prevented from performing select operations, the second predetermined quality threshold associated with a poor network coverage where the device is prevented from performing select operations;

verifying that the network coverage is weak based on a radio link failure (RLF) rate, a cell reselection rate, an out of service (OOS) indication rate, or a combination thereof, the RLF rate indicating a number of RLFs occurring over the period of time, the cell reselection rate indicating a number of cell reselections occurring over the period of time, the OOS indication rate indicating a number of OOS indications over the period of time; and when the network coverage verified as weak, utilizing a mitigation scheme configured to reduce an amount of power used by the device.

* * * * *